United States Patent [19]

Taub et al.

[11] Patent Number: 4,670,636

[45] Date of Patent: Jun. 2, 1987

[54] HEAT ASSISTED PARTING OF AMORPHOUS ALLOYS

[75] Inventors: Alan I. Taub, Schenectady; Peter G. Frischmann, Scotia; Thomas E. Douglas, Schenectady, all of N.Y.

[73] Assignee: General Electric Company, Schenectady, N.Y.

[21] Appl. No.: 651,973

[22] Filed: Sep. 19, 1984

[51] Int. Cl.$^4$ .............................................. B23K 15/00
[52] U.S. Cl. ................. 219/121 EH; 83/175; 219/121 LN; 225/93.5
[58] Field of Search .................. 219/121 EH, 121 EB, 219/121 EM, 121 LG, 121 LN, 121 L, 121 LM; 83/15, 16, 18, 170, 171, 175; 225/1, 2, 93, 93.5

[56] References Cited

U.S. PATENT DOCUMENTS

| | | | |
|---|---|---|---|
| 4,270,682 | 6/1981 | Lavoisey et al. | 225/1 |
| 4,328,411 | 5/1982 | Haller et al. | 219/121 EH |
| 4,356,377 | 10/1982 | Norton et al. | 219/121 EH |

FOREIGN PATENT DOCUMENTS 57170 5/1978 Japan.

OTHER PUBLICATIONS

R. J. Churchill, "Laser Cutting of Amorphous Alloys", Conference Proceedings: Computer-Based Factory Automation, 11th Conf. on Prod. Res. & Tech., Carnegie-Mellon University, Pittsburgh, PA, 5/21-23/84; pp. 226-232, published by Society of Manufacturing Engineers.

*Primary Examiner*—C. L. Albritton
*Attorney, Agent, or Firm*—Paul E. Rochford; James C. Davis, Jr.; Paul R. Webb, II

[57] ABSTRACT

A bundle of articles having at least one small dimension are cut in succession. Tension is developed on the top article of the bundle. Heat is applied rapidly to a seam of the top article to be cut. The separated parts of a top article are withdrawn from the path of the beam and the next article is exposed to the heat.

16 Claims, 11 Drawing Figures

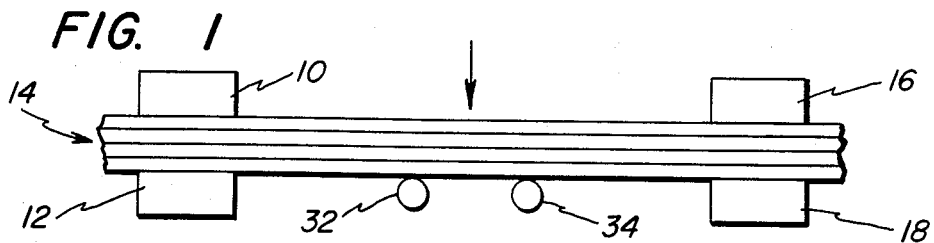
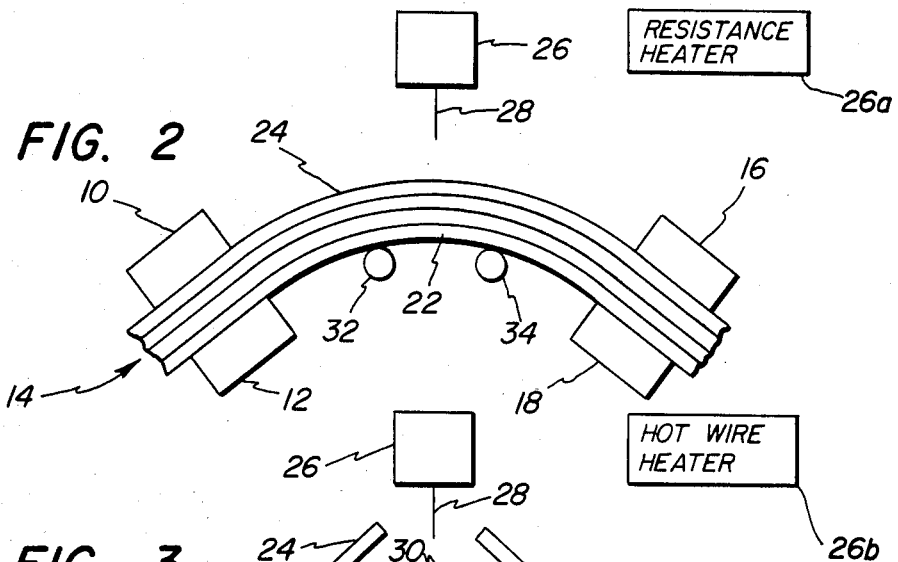
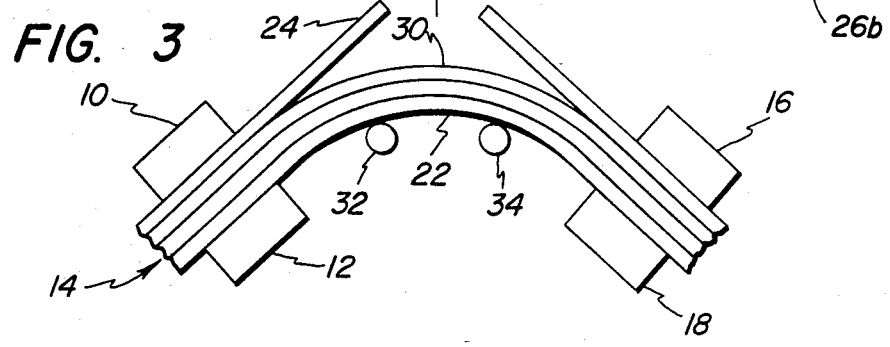
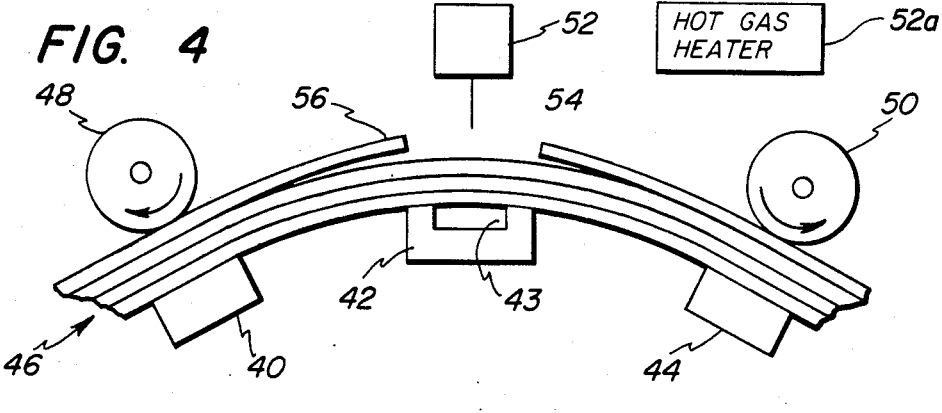

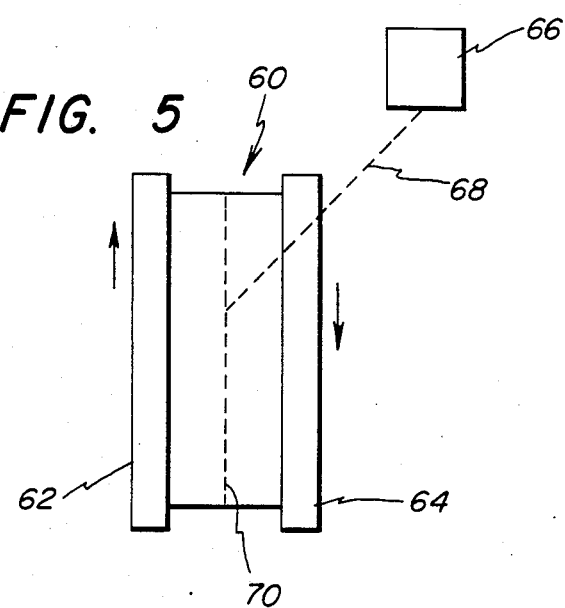
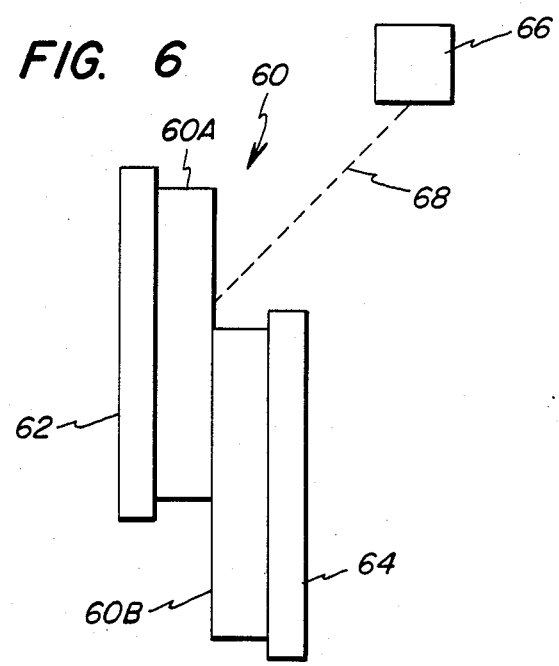

HEAT ASSISTED PARTING OF AMORPHOUS ALLOYS

CROSS REFERENCE TO RELATED APPLICATIONS

The presnet invention is related to the inventions disclosed and claimed in commonly assigned U.S. patent application for dockets RD-15643, now application Ser. No. 657,329, filed Oct. 3, 1984 and docket RD-15710, now application Ser. No. 647,291, filed Sept. 4, 1984.

BACKGROUND OF THE INVENTION

The present invention relates generally to improved methods of severance of amorphous alloy ribbons into parts. More particularly, it relates to the cutting or parting of ribbons formed by rapid solidification of alloys having desirable sets of magnetic and related properties.

It is known that several working or forming or similar treating operations performed on amorphous alloys such as cutting or slitting, are operations which are difficult to perform when the material is worked at room temperature. The cutting of any material requires a flow of the material as the material is cut or worked. At low temperatures, the flow of amorphous alloys is governed by an inhomogeneous deformation mechanism. This deformation mechanism is characterized by high stresses. Because of the high stresses, the tools used in the ambient temperature cutting operations have short useful lives. In addition, it is known that inhomogeneous deformation of amorphous alloys is detrimental to the soft magnetic properties of the alloys.

It has been known, heretofore, that some of the difficulties experienced in working amorphous alloys can be overcome or reduced by performing the working operations at elevated temperatures. This has been reported by Masumoto in Japanese patent application No. 132288, dated Nov. 5, 1976. In this publication, it is taught that forming processes should be applied to the amorphous alloy only at temperatures above the "ductile transition temperature" and this temperature is designated as $T_p$. The same temperature which has been regarded as critical for working has also been referred to as the "plastic transition temperature" in an article by Liebermann, in Mat.Sci.Eng. 46, 241 (1980). It is known that above this plastic transition temperature the amorphous alloys can be worked at low stresses to a high degree of straining. Patterson et al reported the hot forming of a metallic glass and demonstrated this hot forming by drawing a cup from a ribbon of amorphous alloy. This is reported in J. Patterson, A. L. Greer, J. A. Leake and D. R. H. in "Proceedings Third International Conference on Rapidly Quenched Metals," (Chameleon Press, 1978) p. 293.

More recently, Homer and Eberhardt produced strains approaching 1000% in an amorphous alloy ribbon of PdFeSi at stresses as low as 150 Mpa by a deformation which was carried out at high temperatures. This was reported in Scripta Met. 14, 1331 (1980).

In none of the foregoing studies, and methods developed from the studies, was there any concern with the effect of the rate of heating of the article to be worked on the working of the article. A primary consideration in this prior art work was the consideration of the crystallization kinetics of the alloy. An object was to effect the working without imparting significant degrees of crystallinity to the product and in this way to retain the amorphous character of the article which was being worked. The avoidance of crystallization is a primary consideration in retaining the desirable properties of the amorphous alloys.

We have succeeded in discovering a relationship between the softening and the increase in severability of an amorphous alloy article and the heating rate or the rate at which the article is undergoing heating. We have discovered that if the midsection of a length of an amorphous ribbon is heated to and maintained at a softening temperature while held in an Instron Tensile Testing apparatus and the Instron is then activated to apply tensile force to the ribbon, there is a surprising increase in tensile force needed to stretch the ribbon. In one case, a specimen length of amorphous ribbon was mounted in an Instron and the midsection of the ribbon was heated at 128° C./min. to 515° C. and then held at constant temperature. The Instron crosshead motion was initiated at 0.100 inches/min. and it was found that the force needed to stretch a ribbon increased from 4 MPa to 50 MPa within 30 seconds.

It is important to distinguish between the heating history of the article, that is the heating to a certain working temperature, or the rate at which an article has been heated to a certain temperature, and the effect which we have found to be important to severance of the article, namely the rate at which an article is being heated at the time the severance of the article takes place. We have found that an article such as an amorphous alloy undergoes a softening which facilitates severance when and, more specifically, during the time when it is undergoing the heating at a relatively high heating rate.

It has been observed that the heating of an amorphous strip in a narrow region such as a seam causes buckling and distortion of the strip even though the heating is not sufficient to melt or even soften the material of the narrow region.

BRIEF STATEMENT OF THE INVENTION

Accordingly, it is one object of the present invention to provide a method which permits the cutting of amorphous alloy ribbons or wires conveniently.

Another object is to provide a method which permits amorphous alloy ribbons to be cut without use of cutting tools.

Another object is to provide a method which permits an amorphous strip to be heated in a narrow region without causing buckling or distortion of the strip.

Another object is to avoid and prevent the formation of a melt bead or burr at an edge formed by severance thereby improving the stackability of the severed edges of cut ribbon.

Another object is to provide a method for cutting amorphous alloys without significantly detracting from the beneficial magnetic properties of the alloys.

Another object is to provide a method for cutting amorphous alloy ribbons rapidly and conveniently such as might be used in production of articles from such ribbons.

Other objects and advantages of the subject invention will be in part apparent and in part pointed out in the description which follows.

In one of its broader aspects, the objects of the invention may be achieved by placing an amorphous article having at least one small dimension in the path of a source of heating energy which can be applied at a very high rate. While the ribbon is located in the region where it can receive the high rate of heating, tension is applied to the article in directions generally normal to the desired cut. A rapid heating of a nascent seam of the article is undertaken while the tension is being applied to the ribbon. The ribbon is severed into portions along the seam at the time and during the time that the heating is in progress. The high rate of heating may be at or above 500° C./min. An alternative heating rate is above 1000° C./min. Hot gas may be employed for the heating.

The method of the present invention is applicable to amorphous ribbons which have one small dimension, the thickness, and to amorphous wire which has two small dimensions, the thickness and width.

BRIEF DESCRIPTION OF THE DRAWINGS

The explanation which follows will be made clear by reference to the accompanying drawings in which:

FIG. 1 is a schematic illustration of a deck of ribbons held at each end by clamping means.

FIG. 2 is a schematic view of the clamped ribbon deck of FIG. 1 which has been stressed to apply tensile force to the ribbons.

FIG. 3 is a deck of ribbon as illustrated in FIG. 2 to which a heat has been applied causing severance of the upper ribbon.

FIG. 4 is a schematic illustration of the mechanics of an alternative method and means of severing amorphous ribbons according to the present invention.

FIG. 5 is a schematic illustration of an alternative mode of initiating severing an amorphous ribbon pursuant to the present invention.

FIG. 6 is the schematic illustration of FIG. 5 after the severance of an amorphous ribbon has been initiated pursuant to the present invention.

DETAILED DESCRIPTION OF THE INVENTION

Figure 7:
FIG. 7 is a photograph of an amorphous metal ribbon which has been cut with the aid of a quartz line heater.

In carrying out the method of the present invention, it is important to emphasize the dynamic nature of the processing which must be employed. The method depends on a very rapid heating of the ribbon to be separated. Because the heating is so rapid, it is necessary to have the parting stress or other physical force, which is to be employed in causing the lateral movement of the parts of the ribbon to be separated, in place at the time the heating is initiated.

It is quite critical to the practice of the present invention that, at the time the separation of the ribbon along the seam takes place, the bulk of the material of the seam be undergoing an increase in average temperature.

One reason why the tensile force must be applied prior to the rapid heating is the finding which is set forth above that very short term heating of a seam without the application of the tensile force can result in a substantial increase in the resistance of the material in the seam to flow.

Surprisingly, we have found that there is a very low flow resistance in an amorphous alloy during the very first period in which the heating is applied. In this regard, the process depends on rapid heating. The means which applies the most rapid heating is the best for carrying out the subject invention.

Reference is now made to the drawings and particularly to FIG. 1 of the drawing. One method for carrying out the method of the present invention is schematically illustrated in FIG. 1. In this figure, a clamping means shown schematically as a first pair of opposed bar members 10 and 12 are urged together in the normal fashion for mechanically clamping and exerting a strong gripping and compressive pressure through a deck 14 of amorphous alloy ribbons. Similar clamping means 16 and 18 are provided at a distance spaced along the deck 14 of amorphous alloy ribbons. The distance between the clamping means 10-12 and 16-18 may be approximately at equal distances from a point 20 where a desired cut is to be made. However, the distance is not important and any convenient ratio of distances may be employed. The deck 14 may be held on supports 32 and 34.

Referring next to FIG. 2, the clamping means 10-12 and 16-18 are held firmly in place in maintaining a grip on the ends of the deck of amorphous alloy strips but may be turned at an angle so as to bend the deck over the central supports 32 and 34 and to put strong tensile forces along the amorphous strips 24. A source of seam heating energy 26 positioned above the portion of the strip 24 at which a seam is to be formed and a high energy beam 28 is emitted from the source 26 and directed along a selected seam on the uppermost ribbon of the deck.

A suitable source of rapid seam heating energy is either an electron beam or a laser beam or some other form of high energy radiant heat. Alternative rapid heating means such as hot wire heating source, or resistance self heating may be used. The delivered energy acts on the uppermost amorphous alloy strip such as 24 and as illustrated in FIG. 3 causes severance of the strip at the location of seam heating. The separation of the strip portions occurs due to the tensile force being exerted on the strip at the time the high energy seam heating occurs. After the strip 24 is severed, the energy beam 28 strikes the next strip 30 in the deck 14 and starts to heat it at a seam to cause a separation of the second strip in the deck. This separation of the members of the deck into parts by seam heating is carried out as each strip of the deck is heated in succession. The process may be continued until the entire deck is cut so long as tension is maintained on each sample as it is being cut. During the cutting of the first ribbon, and of each ribbon, the heat source imparts sufficient energy to the seam of the top strip so that the seam reaches its softening temperature. Material of the seam flows until a neck forms in the seam and separation occurs.

The present invention can also be practiced to sever a bundle of amorphous wires. For this purpose a bundle of wires can be substituted for the deck of ribbons 14 in the FIGS. 1 through 3 and the wires can be severed essentially as described with reference to FIGS. 1 through 3.

Referring now to FIG. 4, an alternative scheme for producing cuts in the amorphous alloy ribbon is illustrated. In this scheme, the ribbons may be supported on a flat or curved surface shown in FIG. 4 as the three blocks 40, 42 and 44 disposed in a generally arc configuration with middle block 42 at the highest location. Block 42 has an upper central channel 43 aligned with the trajectory of a high energy beam 54 of radiant energy. A deck 46 of amorphous alloy strips is disposed on the surface and two friction rollers 48 and 50 are disposed on and pressed through the deck 46 onto the blocks 40 and 44 respectively. A source of high energy radiation 52 is disposed above the middle of the deck and is adapted to emit an intense beam 54 adapted to deliver heat energy to the amorphous strip.

With the apparatus in place as illustrated, the friction rollers 48 and 50 are activated and the beam source 52 delivers its high energy beam to a proposed seam in the uppermost amorphous alloy strip 56. When the seam reaches the softening temperature, there is a flow of material in the seam and it necks down and then undergoes separation. Ribbons are withdrawn by the action of the friction rollers and expose a lower ribbon which is then subjected to the same heating as described above. Alternative heat sources such as 26a employing resistance heating or 26b employing hot wire heating or 52a employing hot gas heating may be employed in place of heat source 26 or 52.

Referring now to FIG. 5 a section of strip 60 is held between two edge clamps 62 and 64 which are firmly clamped on the edges of the section of strip 60. The clamp 62 is adapted to be held stationary or moved upward and the clamp 64 is adapted to be moved downward in the direction of the arrow alongside of the clamp. A source 66 of a narrow beam 68 of high energy radiation is disposed in a position to direct the beam along a proposed seam indicated by dash line 70 on the section 60 of amorphous strip.

The edge clamps are positioned to be moved to apply a shearing force with the strip 60 and accordingly along the proposed seam 70 where the beam 68 can traverse the strip section.

In performing the heat assisted parting according to the present invention a force is first applied to the edge clamp 64 to urge it into a downward motion relative to the edge clamp 62 affixed to the opposite edge of the section 60 of the amorphous strip. After the shear force has been applied to the section 60 the beam 68 is made to traverse the amorphous strip 60 along the proposed seam 70 to rapidly heat the seam 70 at a heating rate of at least several hundred degrees centigrade per minute. Because the shearing force has already been applied to the amorphous strip 60 the rapid heating of the seam 70 results in the shearing of the material of the seam 70 and the parting of the strip into the two portions 60A as illustrated in FIG. 6 and 60B as also illustrated in FIG. 6. In causing this parting the clamp 64 is moved downward in the direction indicated by the arrows adjacent to the clamp and the clamp 62 is held stationary. Accordingly the section 60A of strip 60 is held in position by the edge clamp 62 and the portion 60B is moved downward relative to 60A by movement of the edge clamp 64 in response to a force applied to clamp 64 by means not shown.

A number of strips were separated employing the process of the present invention. One such sample illustrated in FIG. 7 was put under tension and was heated by a quartz lime heater while under tension. As is evident from the figure, the ribbon severed to form are irregular cut edge. Also, some stretching of the ribbon occurred at some distance from the newly formed edge. The relatively wide heated zone produced by use of the quartz line heater caused a large area of deformation proximate the cut edge.

Figure 9:
FIG. 9 is a photomicrograph in cross section at 200× of an amorphous metal ribbon which has been heated by an electron beam and parted.
Figure 8:
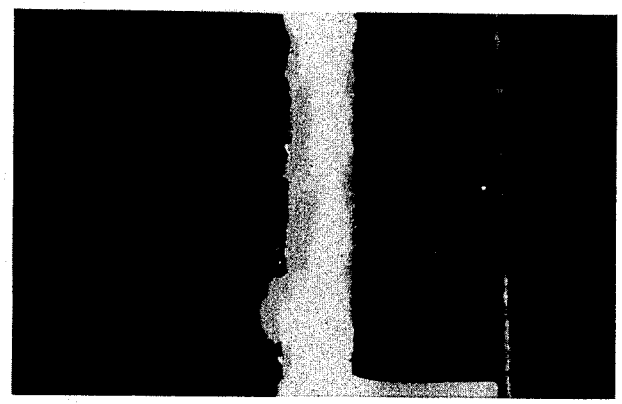
FIG. 8 is a photograph of an amorphous metal ribbon which has been parted with the aid of electron beam heating.

Referring next to FIG. 8, the ribbon of this figure was cut by placing the ribbon under tension and heating a narrow zone by an electron beam. The finer focus of the heat into a narrow zone results in a narrower deformation zone in the cut ribbon. FIG. 9 is an edge view of the ribbon cut as described with reference to FIG. 8.

Figure 10:
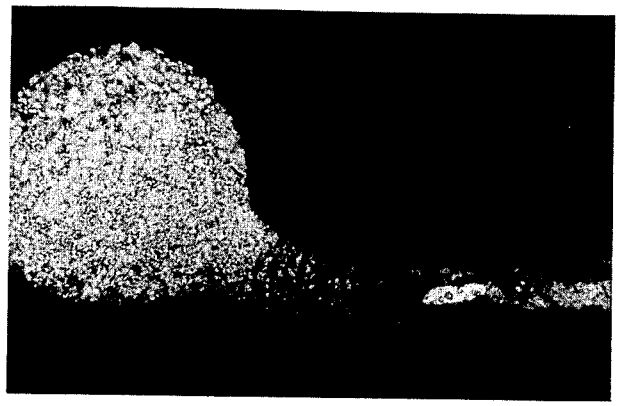
FIG. 10 is an enlarged photograph of the edge of a ribbon heated and cut with an electron beam without application of tension across the area to be cut.

Referring to FIG. 10 an enlarged view is provided of the edge of a ribbon cut by an electron beam alone and without the application of tension to the ribbon at the time of cutting. Note the large bead which is formed at the edge of the ribbon where the cut is made by the heat of the electron beam.

Figure 11:
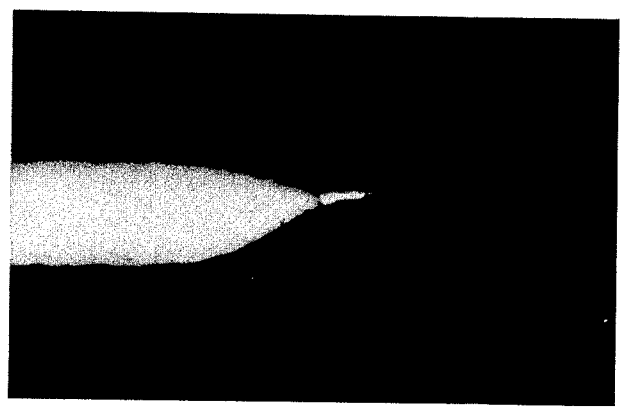
FIG. 11 is a photomicrograph at 1000× of the edge of a ribbon sample which has been cut with the aid of combined heat and tension, the heat being supplied from a laser.

A sharp contrast with the results obtained as illustrated in FIG. 10 is provided by comparing the cut ribbon illustrated in FIG. 10 with that illustrated in FIG. 11. The ribbon illustrated in FIG. 11 was cut by heating a narrow margin of a ribbon under tension using a laser as the heat source.

It will be understood that although the severance which is accomplished pursuant to the present invention can and does readily separate parts of an amorphous strip completely into two completely separate components, that the method is also effective in accomplishing partial separation.

For example, with reference to FIG. 5, if the force applied to the clamps 62 and 64 is torsional rather than in shear, a torsional or tearing force will be developed through strip 60. For example, if clamp 64 is rotated into the plane of the paper in a clockwise direction and the clamp 62 is rotated out of the plane of the paper in a counterclockwise direction then a torsional or tearing force will be developed in strip 60 and along latent seam 70. A rapid heating along a portion of seam 70 will cause the strip 70 to be separated along the heated portion of the seam due to the torsional force applied to the clamps.

In fact, with a torsional force applied as described, the separation can occur continuously and progressively along the seam as the length of the seam itself is progressively heated by the heat source such as the high energy beam of radiant energy.

What is claimed and sought to be protected by Letters patent of the United States is as follows:

1. The method of severing into parts an amorphous metal article having at least one small dimension which comprises developing a force in the portion of the article to be severed in a direction to cause separation of parts along a proposed line of severence, heating the article along the proposed line of severence at a rate of 500° C./min to a temperature below the crystallization temperature and above the softening temperature of the article while the severence force is applied, and separating portions of the article along the line of heating while the heating is in progress.

2. The method of claim 1 wherein the heating rate is above 500° C./min.

3. The method of claim 1 wherein the heating rate is above 1000° C./min.

4. The method of claim 1 wherein the article is a ribbon and the heating is by a narrow beam of radiant energy traversed along a surface of the ribbon to be cut.

5. The method of claim 1 wherein the heating is by resistance self heating through the article to be cut.

6. The method of claim 1 wherein the heating is by a hot wire held against the surface of the article to be cut.

7. The method of claim 1 wherein the heating is by an electron beam heating source.

8. The method of claim 1 wherein the heating is by a laser beam as a source of heating.

9. The method of claim 1 wherein the heating is by hot gas.

10. The method of severing members of a deck of amorphous metal ribbons into parts which comprises,
   forming a deck of at least two ribbons to be cut,
   applying tension to the ribbons of the deck,
   directing a narrow beam of high energy radiation onto an exposed ribbon of said deck along a line of the ribbon to be severed,
   continuing the applied tension as the line of the ribbon is heated to cause said ribbon to separate into parts,
   withdrawing the parts of the severed ribbon to expose the next lower ribbon to the narrow beam of radiation.

11. The method of claim 10 wherein the heating rate is above 500° C./min.

12. The method of claim 10 wherein the heating rate is above 1000° C./min.

13. The method of claim 10 wherein the heating is by a narrow beam of radiant energy traversed along a surface of the ribbon to be cut.

14. The method of claim 10 wherein the heating is by an electron beam heating source.

15. The method of claim 10 wherein the heating is by a laser beam as a source of heating.

16. The method of claim 1 in which the force is applied to cause shearing along the proposed line of severance.

* * * * *